United States Patent
Lee et al.

(10) Patent No.: US 11,057,750 B2
(45) Date of Patent: Jul. 6, 2021

(54) INTELLIGENT DEVICE CONTROLLING METHOD, MOBILE TERMINAL AND INTELLIGENT COMPUTING DEVICE

(71) Applicant: LG ELECTRONICS INC., Seoul (KR)

(72) Inventors: Kyuho Lee, Seoul (KR); Jaewoong Jeong, Seoul (KR); Youngman Kim, Seoul (KR); Sangjun Oh, Seoul (KR); Seunghyun Hwang, Seoul (KR)

(73) Assignee: LG ELECTRONICS, Seoul (KR)

( * ) Notice: Subject to any disclaimer, the term of this patent is extended or adjusted under 35 U.S.C. 154(b) by 0 days.

(21) Appl. No.: 16/577,811

(22) Filed: Sep. 20, 2019

(65) Prior Publication Data

US 2020/0021954 A1 Jan. 16, 2020

(30) Foreign Application Priority Data

Aug. 30, 2019 (KR) .................. 10-2019-0107791

(51) Int. Cl.
*H04M 3/00* (2006.01)
*H04W 4/16* (2009.01)
(Continued)

(52) U.S. Cl.
CPC ............. *H04W 4/16* (2013.01); *H04L 12/282* (2013.01); *H04L 12/2809* (2013.01);
(Continued)

(58) Field of Classification Search
CPC ............... H04W 4/16; H04L 12/2809; H04L 2012/2841
(Continued)

(56) References Cited

U.S. PATENT DOCUMENTS

| 2008/0238661 | A1* | 10/2008 | Camp | H04L 12/282 |
| | | | | 340/539.21 |
| 2008/0310610 | A1* | 12/2008 | Serafat | H04W 8/22 |
| | | | | 379/201.02 |
| 2017/0108236 | A1* | 4/2017 | Guan | H05B 47/11 |

FOREIGN PATENT DOCUMENTS

| KR | 10-1474645 B1 | 12/2014 |
| KR | 10-2015-0076509 A | 7/2015 |
| KR | 10-1871714 B1 | 6/2018 |

* cited by examiner

*Primary Examiner* — William J Deane, Jr.
(74) *Attorney, Agent, or Firm* — Birch, Stewart, Kolasch & Birch, LLP

(57) ABSTRACT

An intelligent device controlling method, a mobile terminal, and a computing device are provided. A mobile terminal for controlling intelligently a device according to an embodiment of the present disclosure receives a call for a call connection, selects at least one control target device to control an operation while the call is connected, based on a location of the mobile terminal, selects a control item of the at least one control target device using a plurality of pre-learned control methods, and controls the control item for the at least one control target device in a state where the call is connected. Accordingly, it is possible to improve a call environment by controlling an operation of a device around a smart phone at the time of a call connection of the smart phone. At least one of a mobile terminal and an intelligent computing device of the present disclosure is associated with an artificial intelligence module, an unmmanned aerial vehicle (UAV), a robot, an augmented reality (AR) device, a virtual reality (VR) device, and a device related to a 5G service.

9 Claims, 8 Drawing Sheets

(51) Int. Cl.
   *H04W 64/00* (2009.01)
   *H04L 12/28* (2006.01)
   *H04W 60/00* (2009.01)
(52) U.S. Cl.
   CPC ........... *H04W 60/00* (2013.01); *H04W 64/00* (2013.01); *H04L 2012/2841* (2013.01)
(58) Field of Classification Search
   USPC .................................................. 379/201.01
   See application file for complete search history.

[FIG. 1]
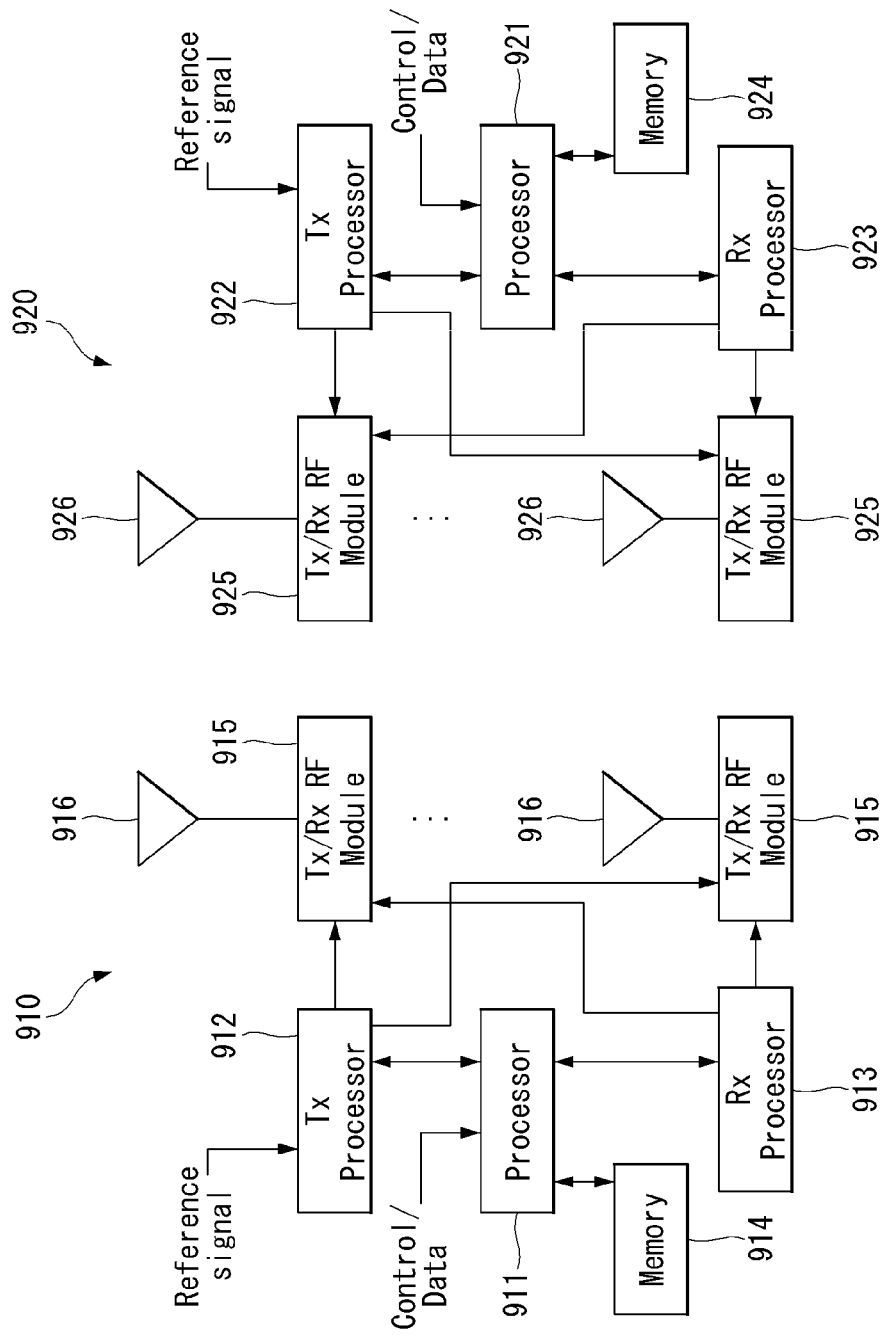

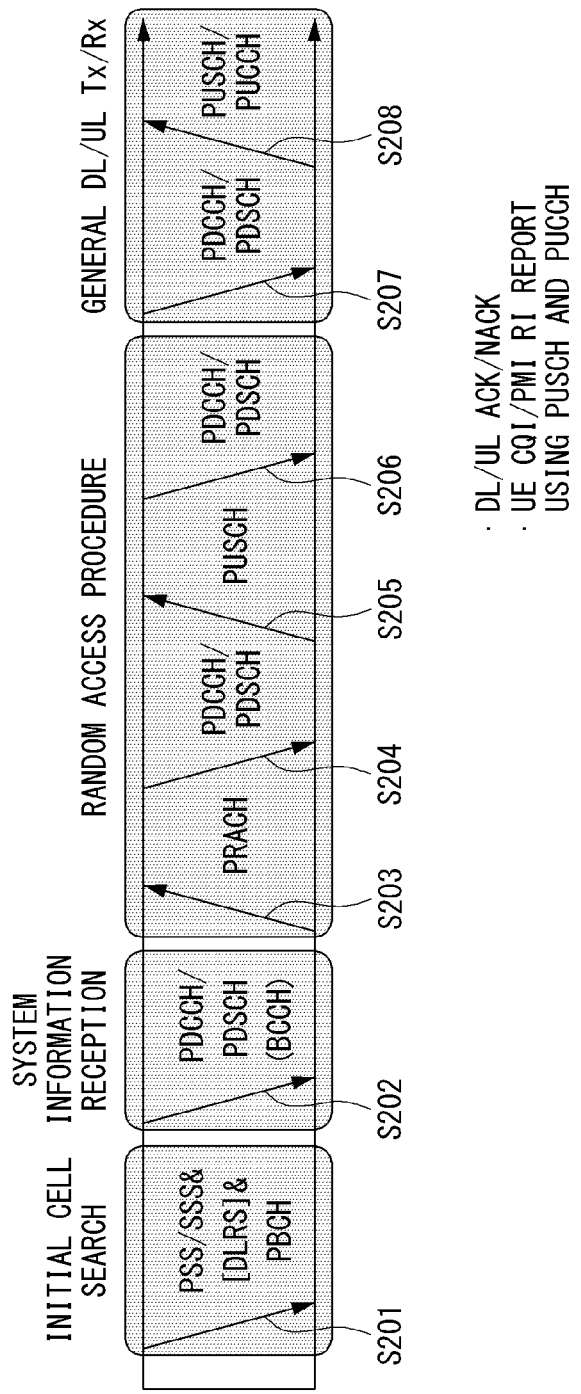

[FIG. 3]
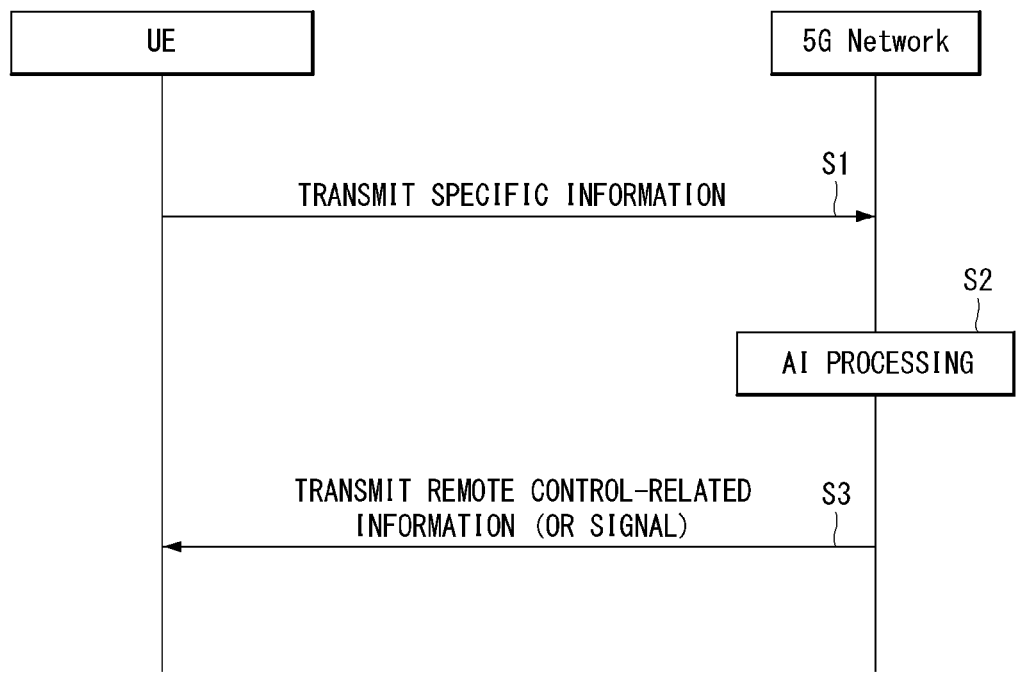

【FIG. 4】
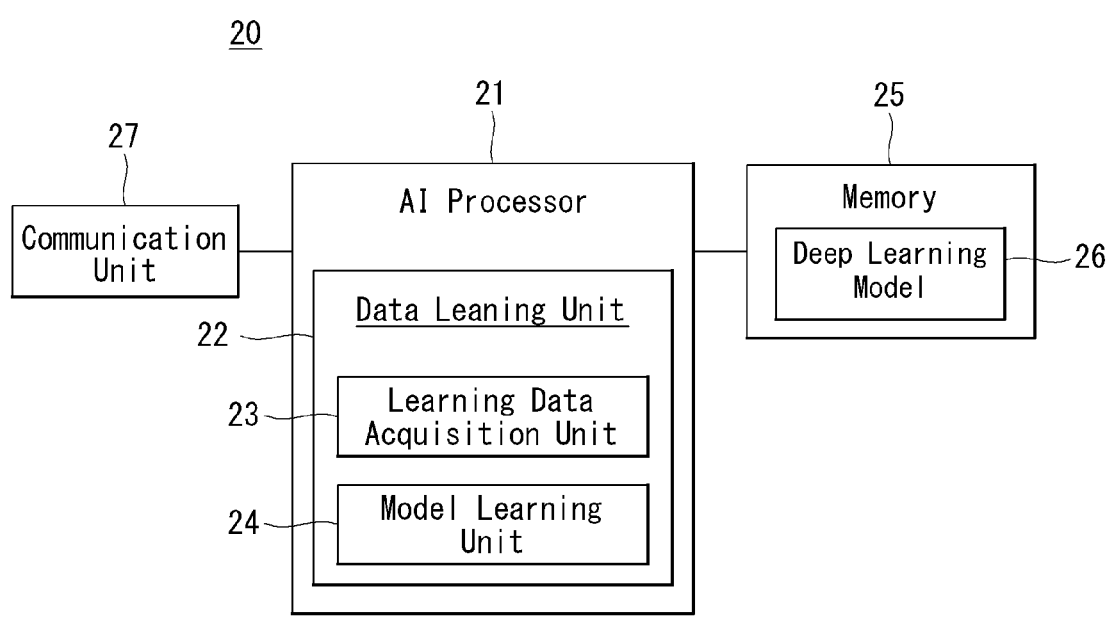

[FIG. 5]
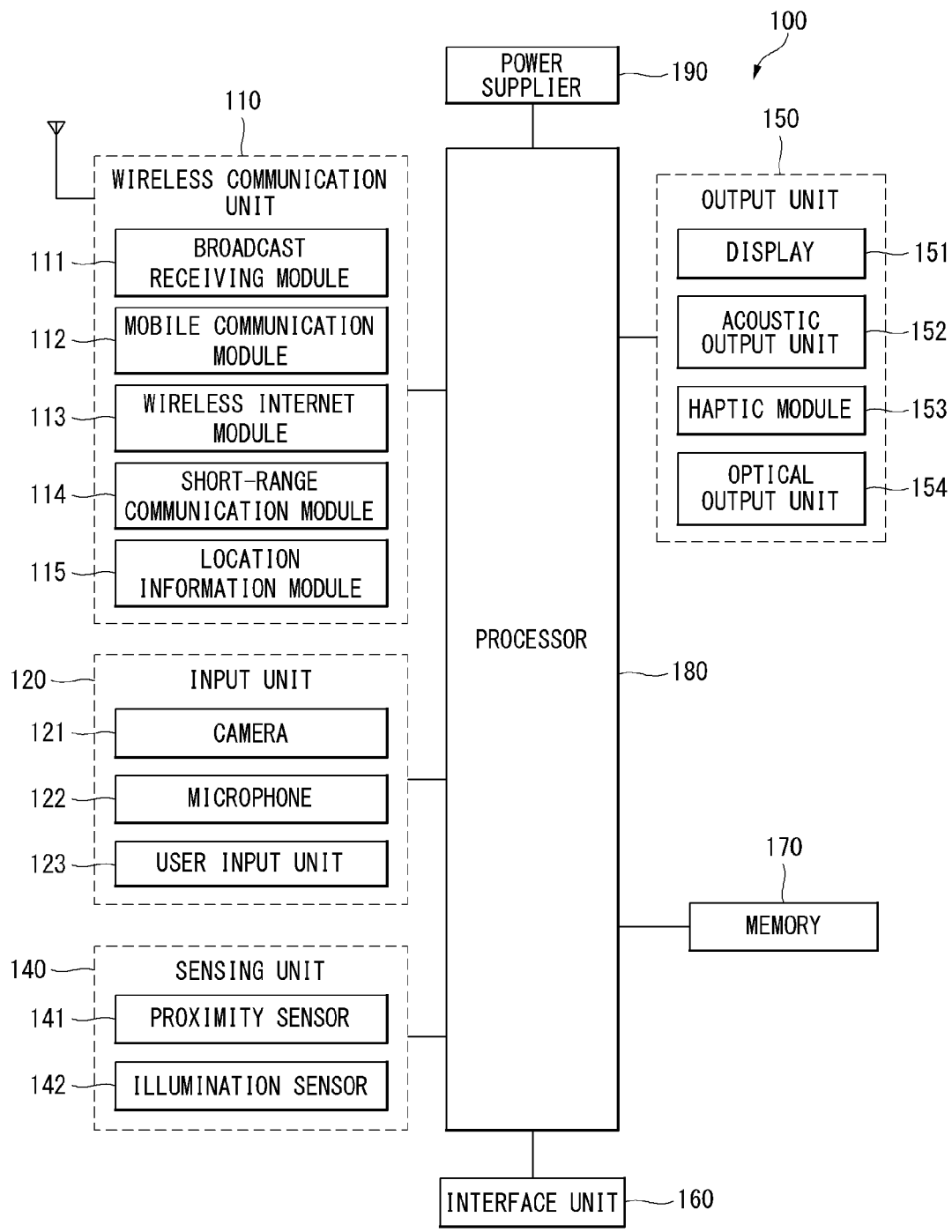

[FIG. 6]
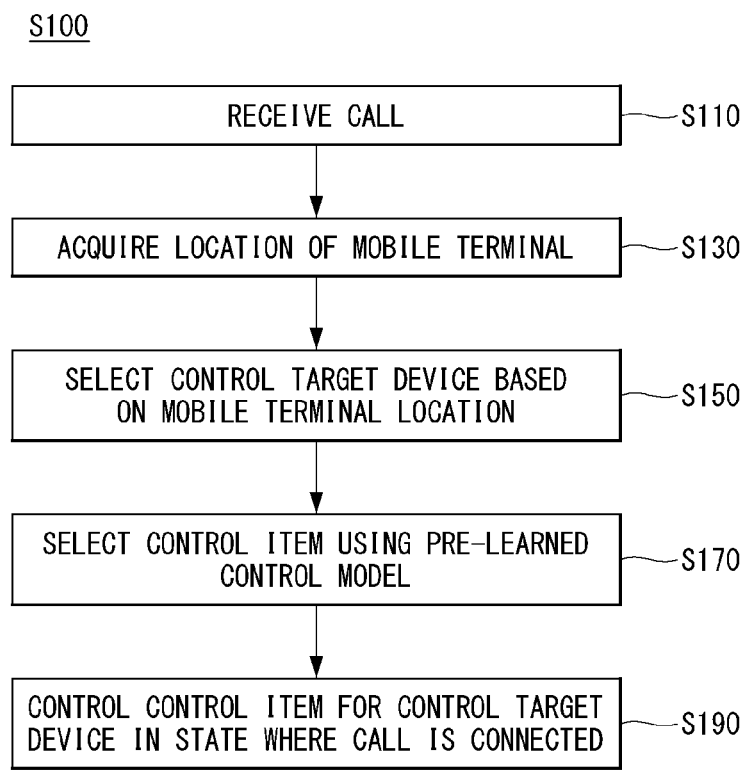

[FIG. 7]
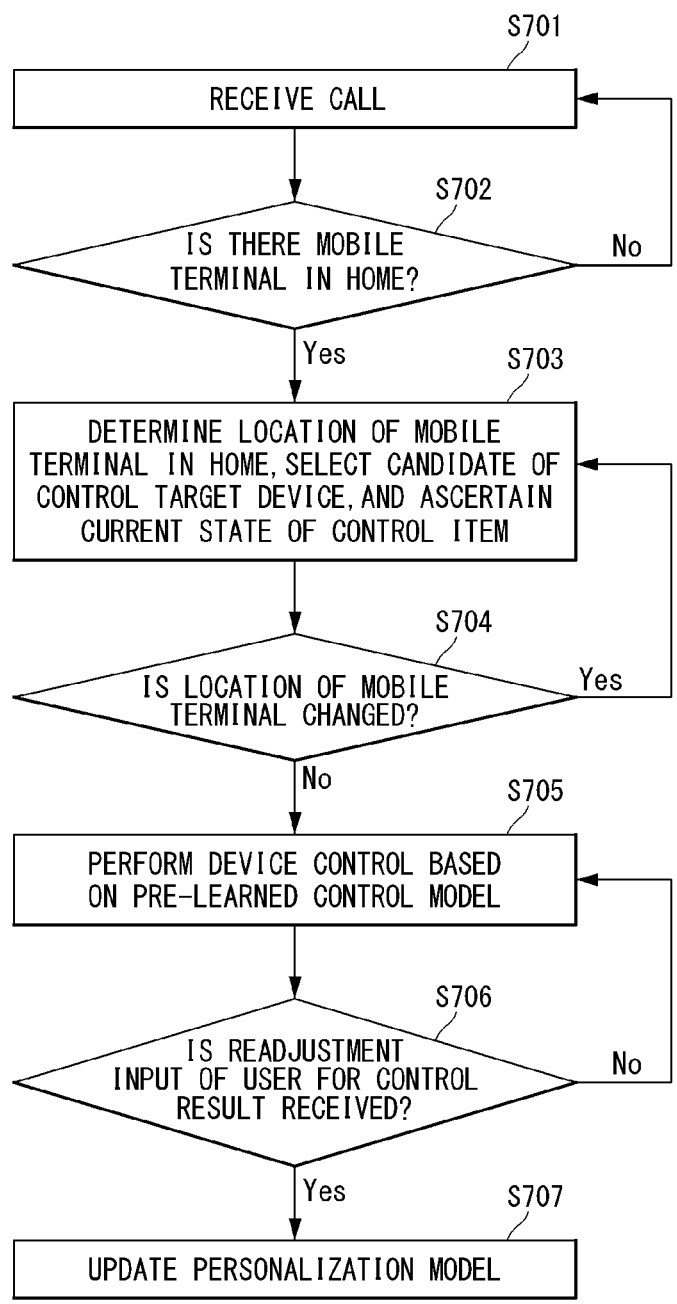

[FIG. 8]
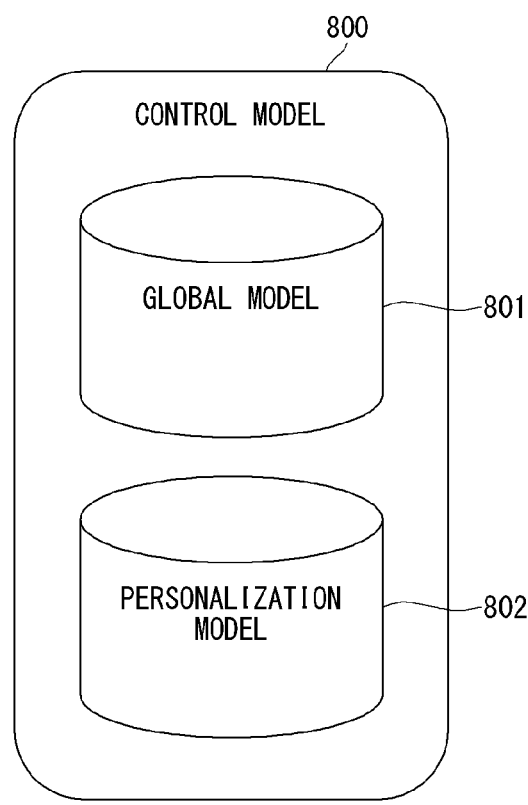

INTELLIGENT DEVICE CONTROLLING METHOD, MOBILE TERMINAL AND INTELLIGENT COMPUTING DEVICE

CROSS-REFERENCE TO RELATED APPLICATION(S)

This application is based on and claims priority under 35 U.S.C. 119 to Korean Patent Application No. 10-2019-0107791, filed on Aug. 30, 2019, in the Korean Intellectual Property Office, the disclosure of which is herein incorporated by reference in its entirety.

BACKGROUND OF THE INVENTION

Field of the Invention

The present disclosure relates to an intelligent device controlling device, a mobile terminal, and an intelligent computing device, and particularly, to a method, a mobile terminal, and an intelligent computing device for intelligently controlling peripheral devices at the time of a call connection.

Related Art

Recently, a technology of a smart phone to control a single or a plurality of IoT devices (for example, air conditioners or air purifiers) in accordance with a temperature or air quality conditions in a home environment has been developed.

However, this technology is only a technology for controlling the temperature or the air quality, and a technology for improving a call environment around the smart phone is insufficient at the time of a call connection of the smart phone in an IoT environment.

SUMMARY OF THE INVENTION

An object of the present invention is to meet the needs and solve the problems.

The present disclosure also provides an intelligent device controlling method, a mobile terminal, and an intelligent computing device for improving a call environment around the mobile terminal at the time of a call connection of the mobile terminal.

In an aspect, an intelligent device controlling method of a mobile terminal is provided. The method includes receiving a call for a call connection, selecting at least one control target device to control an operation while the call is connected, based on a location of the mobile terminal, selecting a control item of the at least one control target device using a plurality of pre-learned control models, and controlling the control item for the at least one control target device in a state where the call is connected.

The plurality of control models may include a first control model which is learned based on a device control history for each user of a plurality of external mobile terminals, and a second control model which is learned based on a device control history of a registered user of the mobile terminal.

The second control model may be learned based on the device control history of the registered user and information related to a plurality of callers requesting the call connection to the mobile terminal, and the control item of the at least one control target device may be acquired by inputting information related to the caller corresponding to the received call into the second control model.

When the selected control target device is a sound output device capable of outputting a sound, the control item may include a sound output size of the sound output device.

When the selected control target device is a light output device capable of outputting light, the control item may include a light output size of the light output device.

In another aspect, a mobile terminal for intelligently controlling a device includes a memory, a communication unit, and a processor. The processor receives a call for a call connection, selects at least one control target device to control an operation while the call is connected, based on a location of the mobile terminal. And the processor selects a control item of the at least one control target device using a plurality of pre-learned control models, and controls the control item for the at least one control target device in a state w here the call is connected.

The plurality of control models may include a first control model and a second control model. The first control model which is learned based on a device control history for each user of a plurality of external mobile terminals, and the second control model which is learned based on a device control history of a registered user of the mobile terminal.

The second control model may be learned based on the device control history of the registered user and information related to a plurality of callers requesting the call connection to the mobile terminal, and the control item of the at least one control target device may be acquired by inputting information related to the caller corresponding to the received call into the second control model.

When the selected control target device is a sound output device capable of outputting a sound, the control item may include a sound output size of the sound output device.

When the selected control target device is a light output device capable of outputting light, the control item may include a light output size of the light output device.

In still another aspect, a non-transitory computer-readable medium in which a computer-executable component configured to be executed in one or more processors of a computing device is stored is provided. The computer-executable component receives a call for a call connection and selects at least one control target device to control an operation while the call is connected, based on a location of the mobile terminal. Also the computer-executable component selects a control item of the at least one control target device using a plurality of pre-learned control models, and controls the control item for the at least one control target device in a state where the call is connected.

BRIEF DESCRIPTION OF THE DRAWINGS

The accompanying drawings, included as part of the detailed description in order to provide a thorough understanding of the present invention, provide embodiments of the present invention and together with the description, describe the technical features of the present invention.

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 is a block diagram of an AI device according to an embodiment of the present disclosure.

FIG. 5 shows an intelligent device controller according to an embodiment of the present disclosure.

FIG. 6 is a flowchart showing an intelligent device controlling method according to an embodiment of the present disclosure.

FIG. 7 is a flowchart showing an intelligent device controlling method according to another embodiment of the present disclosure.

FIG. 8 shows a control model according to an embodiment of the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, xis an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

ABM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.
Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to rssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive a DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

FIG. 4 is a block diagram of an AI device according to an embodiment of the present disclosure.

The AI device 20 may include an electronic device having an AI module capable of AI processing, a server including the AI module, or the like. Moreover, the AI device 20 may be included in the device 10 shown in FIG. 4 as a least a part and provided to execute at least a portion of the AI processing together.

The AI processing may include all operations related to the control of the device 10 shown in FIG. 4. For example, an autonomous vehicle may perform the AI processing on sensing data or driver data and may perform processing/determination operation and a control signal generation operation. Moreover, for example, the autonomous vehicle may perform the AI processing on data acquired through an interaction with other electronic devices provided in the vehicle so as to perform an autonomous driving control.

The AI device 20 may include an AI processor 21, a memory 25, and/or a communication unit 27.

The AI device 20 is a computing device capable of learning a neutral network and may be implemented as various electronic devices such as a server, a desktop PC, a notebook PC, or a tablet PC.

The AI processor 21 may learn the neutral network using a program stored in the memory 25. Particularly, the AI processor 21 may learn the neutral network for recognizing device-related data. Here, the neutral network for recognizing the device-related data may be designed to simulate a human brain on a computer and may include a plurality of weighted network nodes which simulate neurons of a human neutral network. The plurality of network modes may transmit and receive data according to a connection relationship so that the neurons simulate synaptic activity of the neurons that send and receive signals through synapses. Here, the neutral network may include a deep-learning model developed from a neutral network model. In the deep-learning model, the plurality of network nodes may be located at different layers and may transmit or receive data according to a convolutional connection relationship. An example of the neutral network model includes various deep-learning techniques such as deep neutral networks (DNN), convolutional deep neutral networks (CNN), a Recurrent Boltzmann Machine (RNN), a Restricted Boltzmann Machine (RBM), deep belief networks (DBN), or a Deep Q-Network, and may be applied to a computer vision, voice recognition, natural language processing, voice/signal processing, or the like.

Meanwhile, the processor which performs the above-described function may be a general purpose processor (for example, CPU), but may be an AI dedicated processor (for example, a GPU) for artificial intelligence learning.

The memory 25 may store various programs and data necessary for an operation of the AI device 20. The memory 25 may be implemented as a nonvolatile memory, a volatile memory, a flash memory, a hard disk drive (HDD), a solid state drive (SDD), or the like. The memory 25 is accessed by the AI processor 21, and reading/writing/modifying/deleting/update of data by the AI processor 21 may be executed. In addition, the memory 25 may store a neutral network model (for example, a deep-learning model 26) generated through a learning algorithm for classification/recognition of data according to an embodiment of the present disclosure.

Meanwhile, the AI processor 21 may include a data learning unit 22 which learns a neutral network for classifying/recognizing data. The data learning unit 22 can learn a criteria as to which learning data to use to determine classification/recognition of the data, and can learn a criteria about how to classify and recognize data using learning data. The data learning unit 22 may learn the deep-learning model by acquiring the learning data to be used for learning and applying the acquired learning data to the deep-learning model.

The data learning unit 22 may be manufactured in a form of at least one hardware chip and mounted on the AI device 20. For example, the data learning unit 22 may be manufactured in a form of a dedicated hardware chip for artificial intelligence (AI), or may be manufactured as a portion of a general purpose processor (CPU) or a graphic dedicated processor (GPU) and mounted on the AI device 20. In addition, the data learning unit 22 may be implemented as a software module.

The data learning unit 22 is implemented as a software module (or program module including instruction), the software module may be stored in a computer readable non-transitory computer readable media. In this case, at least one software module may be provided by an operating system (OS) or may be provided by an application.

The data learning unit 22 may include a learning data acquisition unit 23 and a model learning unit 24.

The learning data acquisition unit 23 can acquire learning data required for the neutral network model to classify and recognize data. For example, the learning data acquisition unit 23 can acquire vehicle data and/or sample data which is input to the neutral network model as the learning data.

The model learning unit 24 may learn using the acquired learning data so that the neutral network model has a determination criteria about how to classify predetermined data. In this case, the model learning unit 24 can cause the neutral network model to learn, through supervised learning using at least a portion of the learning data as the determination criteria. Alternatively, the model learning unit 24 self-learns using the learning data without guidance, and thus, can cause the neutral network model to learn through unsupervised learning finding the determination criteria. Moreover, the model learning unit 24 can cause the neutral work model to learn, through reinforcement learning using a feedback which determines whether a result of a situation determination according to the learning is correct. In addition, the model learning unit 24 can cause the neutral network to learn, using a learning algorithm including error back-propagation or gradient decent.

If the neutral network model is learned, the model learning unit 24 can store the learned neutral network model in a memory. The model learning unit 24 may store the learned neutral network model in a memory of a server connected to the AI device 20 in a wire network or a wireless network.

The data learning unit 22 may further include a learning data preprocessor (not shown) and a learning data selector (not shown) so as to improve an analysis result of a recognition model or save a resource or time required for generating the recognition model.

The learning data preprocessor may preprocess the acquired data so that the acquired data may be used in learning for determining a situation. For example, the learning data preprocessor may process the acquired data into a preset format so that the model learning unit 24 can use the learning data acquired for learning to recognize an image.

Moreover, the learning data selector may select data required for the learning of the learning data acquired by the learning data acquisition unit 23 and the learning data preprocessed by the preprocessor. The selected learning data may be provided to the model learning unit 24. For example, the learning data selector detects a specific region among images acquired by a camera in the vehicle, and thus, may select data with respect to only an object included in the specific region as the learning data.

In addition, the data learning unit 22 may further include a model evaluator (not shown) to improve the analysis result of the neutral network model.

The model evaluator may input evaluation data into the neutral network model, and allow the model learning unit 24 to relearn when the analysis result output from the evaluation data does not satisfy a predetermined criteria. In this case, the evaluation data may be predefined data for evaluating the recognition model. For example, the model evaluator may evaluate that the predetermined criteria are not satisfied when the number or ratio of the evaluation data whose analysis result is not accurate among the analysis results of the learned recognition model for the evaluation data exceeds a predetermined threshold value.

The communication unit 27 may transmit an AI processing result by the AI processor 21 to an external electronic device.

Here, the external electronic device may be defined as an autonomous vehicle. Moreover, the AI device 20 may be defined as another vehicle or 5G network which communicates with the autonomous driving module vehicle. Meanwhile, the AI device 20 may be implemented to be functionally embedded in an autonomous driving module provided in the vehicle. In addition, the 5G network may include a server or a module which performs an autonomous driving related control.

Meanwhile, the AI device 20 shown in FIG. 4 is described to be functionally divided into the AI processor 21, the memory 25, the communication unit 27, or the like. However, note that the above-mentioned components may be integrated into one module and may be called as an AI module.

FIG. 5 shows an intelligent device controller according to an embodiment of the present disclosure.

Referring to FIG. 5, an intelligent service providing device 100 may be a mobile terminal including a wireless communication unit 110, an input unit 120, a sensing unit 140, an output unit 150, an interface unit 160, a memory 170, a processor 180, and a power supplier 190, but is not necessarily limited thereto.

The components shown in FIG. 5 are not essential to implement the mobile terminal (intelligent service providing device), and thus, the mobile terminal described in the present specification may have more or fewer components than those listed above.

More specifically, the wireless communication unit 110 of the components may include one or more modules which enable wireless communication between the intelligent service providing device 100 and a wireless communication system, between the intelligent service providing device 100 and other intelligent service providing devices 100, or between the intelligent service providing device 100 and an external server. In addition, the wireless communication unit 110 may include one or more modules which connect the intelligent service providing device 100 to one or more networks.

The wireless communication unit 110 may include at least one of a broadcast receiving module 111, a mobile communication module 112, a wireless internet module 113, a short-range communication module 114, and the location information module 115.

The input unit 120 may include a camera 121 or an image input unit for inputting an image signal, a microphone 122 or an audio input unit for inputting an audio signal, or a user input unit 123 (for example, a touch key, a mechanical key, or the like) receiving information from the user. Voice data or image data collected by the input unit 120 may be analyzed and processed by a control command of the user.

The sensing unit 140 may include one or more sensors for sensing at least one of information in the mobile terminal, surrounding environment information surrounding the mobile terminal, and user information. For example, the sensing unit 140 may include at least one of a proximity sensor 141, an illumination sensor 142, an illumination sensor, a touch sensor, an acceleration sensor, a magnetic sensor, a G-sensor, a gyroscope Sensor, a motion Sensor, a RGB sensor, an infrared sensor (IR sensor), a finger scan sensor, an ultrasonic sensor, an optical sensor (for example, camera (refer to 121)), a microphone (refer to 122), a battery gauge, an environmental sensor (for example, barometer, hygrometer, thermometer, radiation detection sensor, thermal sensor, gas sensor, or the like), a chemical sensor (for example, electronic nose, healthcare sensor, biometric sensor, or the like). Meanwhile, the mobile terminal disclosed in the present specification may use a combination of information sensed by at least two or more of these sensors.

The output unit 150 is for generating an output related to sight, hearing, or tactile sense, and includes at least one of a display 151, an acoustic output unit 152, a haptic module 153, and an optical output unit 154. The display 151 forms a layer structure with or is integrally formed with the touch sensor, and thus, may implement a touch screen. The touch screen may provide an output interface between the intelligent service providing device 100 and the user while functioning as the user input unit 123 providing an input interface between the intelligent service providing device 100 and the user.

The interface unit 160 serves as a path to various types of external devices connected to the intelligent service providing device 100. The interface unit 160 may include at least one of a wired/wireless headset port, an external charger port, a wired/wireless data port, a memory card port, a port for connecting a device provided with an identification module, an audio input/output (I/O) port, a video input/output (I/O) port, and an earphone port. The intelligent service providing device 100 may perform an appropriate control related to the connected external device in response to the connection of the external device to the interface unit 160.

In addition, the memory 170 stores data supporting various functions of the intelligent service providing device 100. The memory 170 may store a plurality of application programs or applications running on the intelligent service providing device 100 and data and instructions for operating the intelligent service providing device 100. At least some of these application programs may be downloaded from an external server via wireless communication. In addition, at least some of these application programs may exist on the intelligent service providing device 100 from the time of shipment for basic functions (for example, incoming call function, outgoing call function, message receiving function, message outgoing function) of the intelligent service providing device 100. Meanwhile, the application program may be stored in the memory 170 and installed on the intelligent service providing device 100 so as to be driven by the processor 180 to perform an operation (or function) of the mobile terminal.

In general, the processor 180 controls an overall operation of the intelligent service providing device 100 in addition to the operation related to the application program. The processor 180 may provide or process information or a function appropriate to the user by processing signals, data, information, or the like, which are input or output through the above-described components, or by running an application program stored in the memory 170.

Moreover, the processor 180 may control at least some of the components described with reference to FIG. 5 to run an application program stored in the memory 170. Moreover, the processor 180 may combine at least two or more of the components included in the intelligent service providing device 100 to run the application program to operate the combination.

The power supplier 190 receives power from an external power source or an internal power source under the control of the processor 180 to supply power to each component included in the intelligent service providing device 100. The power supplier 190 includes a battery, which may be a built-in battery ora replaceable battery.

At least some of the components may operate in cooperation with each other to implement an operation, control, or control method of the mobile terminal according to various embodiments described below. In addition, the operation, control, or control method of the mobile terminal may be implemented on the mobile terminal by running at least one application program stored in the memory 170.

Hereinafter, before various embodiments implemented through the intelligent service providing device 100 described above will be described, the components listed above will be described in more detail with reference to FIG. 1.

First, referring to the wireless communication unit 110, the broadcast receiving module 111 of the wireless communication unit 110 receives a broadcast signal and/or broadcast related information from an external broadcast management server through a broadcast channel. The broadcast channel may include a satellite channel and a terrestrial channel. Two or more broadcast receiving modules may be provided in the mobile terminal 100 for simultaneous broadcast reception or broadcast channel switching for at least two broadcast channels.

The mobile communication module 112 transmits or receives wireless signals with at least one of a base station, an external terminal, and a server on a mobile communication network constructed according to technical standards or communication schemes (for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like) for mobile communication.

The wireless signal may include various types of data according to transmission and reception of a voice call signal, a video-call call signal, or a text/multimedia message.

The wireless internet module 113 refers to a module for wireless internet access and may be built in or may be externally attached to the intelligent service providing device 100. The wireless internet module 113 is configured to transmit and receive wireless signals in a communication network in accordance with wireless internet technologies.

For example, the wireless internet technology includes a wireless LAN (WLAN), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), or long term evolution-advanced (LTE-A). The wireless internet module 113 transmits or receives data according to at least one wireless internet technology in a range including the internet technologies not listed above.

In view of the fact that the wireless internet connection through WiBro, HSDPA, HSUPA, GSM, CDMA, WCDMA, LTE, LTE-A, or the like is made through a mobile communication network, the wireless internet module 113 for performing a wireless internet connection through the mobile communication network may be understood as a kind of the mobile communication module 112.

The short-range communication module 114 is for short range communication, and may support the short range communication using at least one of Bluetooth™, radio frequency identification (RFID), infrared data association (IrDA), ultra wideband (UWB), ZigBee, near field communication (NFC), wireless-fidelity (Wi-Fi), Wi-Fi Direct, and wireless universal serial bus (Wireless USB) technologies. The short-range communication module 114 may support wireless communication between the intelligent service providing device 100 and the wireless communication system, wireless communication between the intelligent service providing device 100 and other intelligent service providing devices 100, or wireless communication between the intelligent service providing device 100 and a network at which another mobile terminal 100 (or external server) is located, through the short-range wireless area networks. The short-range wireless area network may be a short-range wireless personal area networks.

Herein, another intelligent service providing device 100 is a wearable device (for example, smart watch, smart glass, head mounted display (HMD) capable of exchanging (or interworking with) the data with the intelligent service providing device 100 according to the present disclosure. The short-range communication module 114 may detect (or recognize) a wearable device which can communicate with the intelligent service providing device 100, around the intelligent service providing device 100. Further, when the detected wearable device is a device authorized to communicate with the intelligent service providing device 100 according to the present disclosure, the processor 180 may transmit at least a portion of data processed by the intelligent service providing device 100 to the wearable device through the short-range communication module 114. Accordingly, the user of the wearable device may use data processed by the intelligent service providing device 100 through the wearable device. For example, according to this, when the call is received by the intelligent service providing device 100, the user can perform a phone call through the wearable device, or when the message is received by the intelligent service providing device 100, the user can confirm the received message through the wearable device.

The location information module 115 is a module for acquiring a location (or current location) of the mobile terminal, and a representative example thereof is a global positioning system (GPS) module or a wireless fidelity (WiFi) module. For example, if a mobile terminal uses the GPS module, it is possible to acquire the location of the mobile terminal using a signal transmitted from a GPS satellite. As another example, if the mobile terminal uses the Wi-Fi module, it is possible to acquire the location of the mobile terminal based on information of the Wi-Fi module and a wireless access point (AP) transmitting or receiving a wireless signal. If necessary, the location information module 115 may perform any function of other modules of the wireless communication unit 110 to substitute or additionally obtain data regarding the location of the mobile terminal. The location information module 115 is a module used to acquire the location (or current location) of the mobile terminal, and is not limited to a module which directly calculates or acquires the location of the mobile terminal.

Next, the input unit 120 is for inputting image information (or signal), audio information (or signal), data, or information input from a user, and the intelligent service providing device 100 may include one or a plurality of cameras 121 to input the image information. The camera 121 processes an image frame such as a still image or a moving image obtained by an image sensor in a video call mode or a photographing mode. The processed image frame may be displayed on the display 151 or stored in the memory 170. Meanwhile, the plurality of cameras 121 provided in the intelligent service providing device 100 may be disposed to form a matrix structure, and through the camera 121 forming the matrix structure in this way, a plurality of image information having various angles or focuses may be input into the intelligent service providing device 100. In addition, the plurality of cameras 121 may be disposed in a stereo structure to acquire a right image and a left image for implementing a stereoscopic image.

The microphone 122 processes an external sound signal into electrical voice data. The processed voice data may be variously used according to a function (or an application program being executed) performed by the intelligent service providing device 100. Meanwhile, various noise removal algorithms may be implemented in the microphone 122 to remove a noise generated in the process of receiving an external sound signal.

The user input unit 123 is for receiving information from a user, and when information is input through the user input unit 123, the processor 180 may control the operation of the intelligent service providing device 100 according to the input information. The user input unit 123 may include a mechanical input means (or a mechanical key, for example, a button, a dome switch, a jog wheel, a jog switch, or the like located on the front and rear surfaces or side surfaces of the intelligent service providing device 100) and touch input means. As an example, the touch input means may include a virtual key, a soft key, or a visual key displayed on the touch screen through software processing, or may include a touch key disposed in a portion other than the touch screen. Meanwhile, the virtual key or the visual key may be displayed on the touch screen while having various forms, and for example, may include a graphic, a text, an icon, a video, or a combination thereof.

Meanwhile, the sensing unit 140 senses at least one of information in the mobile terminal, surrounding environment information surrounding the mobile terminal, and user information, and generates a sensing signal corresponding thereto. The processor 180 may control the driving or operation of the intelligent service providing device 100 or may perform data processing, a function, or an operation related to the application program installed in the intelligent service providing device 100 based on the sensing signal. Representative sensors among various sensors that may be included in the sensing unit 140 will be described in more detail.

First, the proximity sensor 141 refers to a sensor which detects the presence or absence of an object approaching a predetermined detection surface or an object present in the vicinity of the detection surface without using a mechanical contact by using an electromagnetic force or infrared rays.

The proximity sensor 141 may be disposed in the inner region of the mobile terminal covered by the touch screen described above or the proximity sensor 141 may be disposed near the touch screen.

An examples of the proximity sensor 141 includes a transmission photoelectric sensor, a direct reflection photoelectric sensor, a mirror reflection photoelectric sensor, a high frequency oscillation proximity sensor, a capacitive proximity sensor, a magnetic proximity sensor, an infrared proximity sensor, or the like. When the touch screen is a capacitive type screen, the proximity sensor 141 may be configured to detect the proximity of the object by a change of an electric field according to proximity of a conductive object. In this case, the touch screen (or touch sensor) itself may be classified as a proximity sensor.

Meanwhile, for convenience of explanation, an action of bringing the object close to the touch screen without coming into contact with the touch screen to recognize that the object is located on the touch screen is referred to as a "proximity touch", and an action of actually touching the object on the touch screen is referred to as a "contact touch". A location at which the object come into close contact with the touch screen means a location where the object is perpendicular to the touch screen when the object comes into close contact with the touch screen. The proximity sensor 141 may detect a proximity touch and a proximity touch pattern (for example, proximity touch distance, proximity touch direction, proximity touch speed, proximity touch time, proximity touch location, proximity touch movement state, or the like). Meanwhile, the processor 180 may process data (or information) corresponding to the proximity touch operation and the proximity touch pattern detected through the proximity sensor 141 as described above, and further, may output visual information corresponding to the processed data on the touch screen. Furthermore, the processor 180 controls the intelligent service providing device 100 to process different operations or data (or information), depending on whether the touch on the same point on the touch screen is a proximity touch or a contact touch.

The touch sensor detects a touch (or touch input) applied to the touch screen (or display 151) using at least one of various touch methods such as a resistive film method, a capacitive method, an infrared method, an ultrasonic method, and a magnetic field method.

As an example, the touch sensor may be configured to convert a change in a pressure applied to a specific portion of the touch screen or a change in capacitance generated at the specific portion into an electrical input signal. The touch sensor may be configured to detect a location, an area, a pressure at the time of the touch, a capacitance at the time of the touch, or the like on the touch sensor of a touch object touched on the touch sensor. Here, the touch object is an object applying a touch to the touch sensor and may be, for example, a finger, a touch pen, a stylus pen, a pointer, or the like.

In this way, when there is the touch input to the touch sensor, a signal (s) corresponding to the touch input is transmitted to a touch controller. The touch controller processes the signal (s) and then transmits the corresponding data to the processor 180. As a result, the processor 180 may know which area of the display 151 is touched. Here, the touch controller may be a separate component from the processor 180 or may be the processor 180 itself.

Meanwhile, the processor 180 may perform different control or perform the same control according to the type of the touch object which touches the touch screen (or touch key provided in addition to the touch screen). Whether to perform different control or the same control according to the type of the touch object may be determined according to a current operation state of the intelligent service providing device 100 or the application program being executed.

Meanwhile, the touch sensor and the proximity sensor described above may be independently or combined with each other, and may sense various kinds of touches such as a short (or tap) touch, a long touch, a multi touch, a drag touch, a flick touch, a pinch-in touch, a pinch-out touch, a swype touch, or a hovering touch with respect to the touch screen.

The ultrasonic sensor may recognize location information of a sensing target using ultrasonic waves. Meanwhile, the processor 180 may calculate a location of a wave generation source through the information detected from an optical sensor and the plurality of ultrasonic sensors. The location of the wave source may be calculated using a property that light is much faster than the ultrasonic wave, that is, the time that the light reaches the optical sensor is much faster than the time when the ultrasonic wave reaches the ultrasonic sensor. More specifically, a location of the wave source may be calculated using a difference between the time that the light reaches as a reference signal and the time that the ultrasonic wave reaches.

A posture detection sensor may detect movement information such as whether or not the mobile terminal moves, a distance, a speed, an acceleration, or a direction of the mobile terminal, and/or attitude information such as an angle at which the intelligent service providing device 100 is inclined with respect to a predetermined rotation axis.

The posture detection sensor 143 may include at least one acceleration sensor 144, at least one gyroscope (gyro sensor) 143, or a sensing signal processor (not shown) for compensating a sensing value or converting sensing information.

The posture detection sensor may acquire linear movement information, rotational movement information, shaking information, or the like of the intelligent service providing device 100 based on accelerations detected through various sensors. The acceleration sensor 144 detects the movement of the intelligent service providing device 100 and acquires the acceleration thereof, and detects information on whether or not the intelligent service providing device 100 moves, the distance, the speed, the acceleration, the direction, or the like of the movement of the intelligent service providing device 100.

In addition, the gyro sensor 143 may detect the rotation of the intelligent service providing device 100 to acquire an amount of rotation. The acceleration sensor 143 may express the detected acceleration as vector values for three axes (X, Y, and Z axes), and the gyroscope expresses the detected acceleration as rotation vector values (roll, pitch, yaw) for three axes. By providing the acceleration sensor 144 and the gyro sensor 143, the posture detection sensor can ascertain the speed, location, and location change of the intelligent service providing device 100. The posture detection sensor may be a general inertial navigation system (INS), and the gyro sensor may be a gyroscope such as an optical gyroscope, a mechanical gyroscope, or a piezoelectric gyroscope.

Meanwhile, the sensing signal processor (not shown) converts the analog signal output from the acceleration sensor and the gyroscope into an analog/digital signal, integrates the converted signal to track a trajectory, and may convert the signal into the movement information, the angle information, the shake information, or the like.

Hereinbefore, the posture detection sensor including the accelerator sensor 144 and the gyro sensor 143 for acquiring the posture and movement of the intelligent service providing device 100 according to the embodiment of the present disclosure is described. However, the present disclosure is not limited thereto, and it is possible to acquire the movement information and the posture information of the intelligent service providing device 100 using any sensor within a scope capable of achieving the object of the present disclosure.

Meanwhile, the camera 121, which is described as the configuration of the input unit 120, includes at least one of a camera sensor (for example, CCD, CMOS, or the like), a photo sensor (or an image sensor), and a laser sensor.

The camera 121 and the laser sensor may be combined with each other to detect a touch of a sensing target with respect to a 3D stereoscopic image. The photo sensor may be stacked on the display element, which is configured to scan the movement of the sensing object in proximity to the touch screen. More specifically, in the photo sensor, photo diodes and transistors (TR) are mounted in rows/columns, and a content placed on the photo sensor is scanned by using an electrical signal changed according to the amount of light applied to the photo diodes. That is, the photo sensor calculates coordinates of the sensing target according to an amount of change of light, and through this calculation, location information of the sensing target may be acquired.

The display 151 displays (outputs) information processed by the intelligent service providing device 100. For example, the display 151 may display execution screen information of an application program driven by the intelligent service providing device 100, or user interface (UI) information and graphical user interface (GUI) information according to the execution screen information.

In addition, the display 151 may be constituted by a stereoscopic display for displaying a stereoscopic image.

A three-dimensional display method such as a stereoscopic method (glasses method), an auto stereoscopic method (glasses-free method), or a projection method (holographic method) may be applied to the stereoscopic display.

The acoustic output unit 152 may output audio data received from the wireless communication unit 110 or stored in the memory 170 in a call signal reception mode, a call mode or a recording mode, a voice recognition mode, a broadcast reception mode, or the like. The acoustic output unit 152 may also output a sound signal related to a function (for example, a call signal reception sound, a message reception sound, or the like) performed by the intelligent service providing device 100. The acoustic output unit 152 may include a receiver, a speaker, a buzzer, or the like.

The haptic module 153 generates various tactile effects that a user can feel. A representative example of the tactile effect generated by the haptic module 153 may be vibration. An intensity and pattern of the vibration generated by the haptic module 153 may be controlled by a selection of the user or setting of the processor. For example, the haptic module 153 may synthesize different vibrations and output or sequentially output the vibrations.

In addition to the vibration, the haptic module 153 may generate various tactile effects such as effects by stimulation such as a pin arrangement moving perpendicular to the contact skin surface, an injection force or suction force of air through an injection port or a suction port, grazing to a skin surface, contact of an electrode, an electrostatic force, or the like, or effects by coldness and warmth feeling reproduction using an element capable of absorbing or generating heat.

The haptic module 153 may not only deliver the tactile effect through a direct contact, but may also be implemented to allow the user to feel the tactile effect through a muscle sense such as a finger or an arm of the user. Two or more haptic modules 153 may be provided according to a configuration aspect of the intelligent service providing device 100.

The optical output unit 154 outputs a signal for notifying occurrence of an event by using light of a light source of the intelligent service providing device 100. Examples of events generated by the intelligent service providing device 100 may include a message reception, a call signal reception, a missed call, an alarm, a calendar notification, an email reception, an information reception through an application, or the like.

The signal output by the optical output unit 154 is implemented as the mobile terminal emits light of a single color or a plurality of colors to a front or rear of the mobile terminal. The signal output may be terminated by the mobile terminal detecting the event confirmation of the user.

The interface unit 160 serves as a path to all external devices connected to the intelligent service providing device 100. The interface unit 160 receives data from an external device or receives power to transfer the data or the power to each component inside the intelligent service providing device 100, or transmits data within the intelligent service providing device 100 to an external device. For example, the interface unit 160 may include a wired/wireless headset port, an external charger port, a wired/wireless data port, a memory card port, or a port for connecting a device having an identification module, an audio input/output (I/O) port, a video input/output (I/O) port, an earphone port, or the like.

Meanwhile, the identification module is a chip which stores a variety of information for authenticating a usage right of the intelligent service providing device (100), and may include a user identification module (UIM), a subscriber identity module (SIM), a universal subscriber identity module (USIM), or the like. A device (hereinafter referred to as an "identification device") having the identification module may be manufactured in the form of a smart card. Therefore, the identification device may be connected to the terminal 100 through the interface unit 160.

In addition, the interface unit 160 may be a path through which power from an external cradle is supplied to the intelligent service providing device 100 when the intelligent service providing device 100 is connected to the external cradle, or may be a path through which various command signals input to the cradle by the user is transmitted to the intelligent service providing device 100. Various command signals or the power input from the cradle may operate as a signal for recognizing that the intelligent service providing device 100 is correctly mounted on the cradle.

The memory 170 may store a program for operating the processor 180, and may temporarily store input/output data (for example, a phone book, a message, a still image, a video, or the like). The memory 170 may store data regarding vibration and sound of various patterns output when a touch input on the touch screen is performed.

The memory 170 may include at least one type of storage medium of a flash memory type storage medium, a hard disk type storage medium, a solid state disk type storage medium, an SSD type storage medium, a silicon disk drive type storage medium, a multimedia card micro type memory, a card type memory (for example, SD or XD memory), a random access memory (RAM), a static random access memory (SRAM), a read-only memory (ROM), an electrically erasable programmable read-only memory (EE- PROM), a programmable read-only memory (PROM), a magnetic memory, a magnetic disk, and an optical disk. The intelligent service providing device 100 may be operated in connection with a web storage that performs a storage function of the memory 170 on the Internet.

Meanwhile, as described above, the processor 180 controls the operation related to the application program, and in general, controls the overall operation of the intelligent service providing device (100). For example, if a state of the mobile terminal satisfies a set condition, the processor 180 may execute or release a lock state which restricts input of the control command of the user to applications.

In addition, the processor 180 may perform a control and processing related to a voice call, a data communication, a video call, or the like, or perform pattern recognition processing for recognizing a handwriting input or a drawing input performed on a touch screen as text and images, respectively. Furthermore, the processor 180 may control any one or a plurality of components described above in order to implement various embodiments described below on the intelligent service providing device 100 according to the present disclosure.

The power supplier 190 receives external power and internal power by the control of the processor 180 to supply power required for the operation of each component. The power supplier 190 includes a battery, and the battery may be a built-in battery configured to be rechargeable, and may be detachably coupled to the terminal body for charging.

In addition, the power supplier 190 may be provided with a connection port, and the connection port may be configured as an example of the interface 160 which is electrically connected to an external charger for supplying power for charging the battery.

As another example, the power supplier 190 may be configured to charge the battery in a wireless manner without using the connection port. In this case, the power supplier 190 may receive the power from an external wireless power transmission device using at least one of an inductive coupling method based on a magnetic induction phenomenon or a magnetic resonance coupling method based on an electromagnetic resonance phenomenon.

Meanwhile, for example, various embodiments described below may be implemented in a recording medium readable by a computer or a similar device using software, hardware, or a combination thereof.

FIG. 6 is a flowchart showing an intelligent device controlling method according to an embodiment of the present disclosure.

As shown in FIG. 6, the mobile terminal 100 may perform an intelligent device controlling method (S100) according to an embodiment of the present disclosure, and detailed descriptions thereof will be described below.

First, the processor 180 of the mobile terminal may receive a call for a call connection from the external mobile terminal through the wireless communication unit 110 (S110).

Here, the device for transmitting the call is not limited to the external mobile terminal, and may be an external server or an external IoT device.

Subsequently, the processor may acquire the location of the mobile terminal at the time of receiving the call for the call connection (S130).

For example, the processor may acquire location information of the mobile terminal through the location information module 115 at the time of receiving the call for the call connection. For example, the processor may determine whether the current location of the mobile terminal is in the home or may determine which room in the home the current location of the mobile terminal is present.

Next, the processor may select a control target device from at least one external device based on the acquired location of the mobile terminal (S150).

For example, the processor may select a device within a predetermined distance from the location of the mobile terminal among the at least one external device as the control target device. For example, the processor may select the control target device by using a previously learned control model.

Subsequently, the processor may select a control item of each selected control target device based on a pre-learned control model stored in the memory 170 (S170).

Here, the pre-learned control model may be a plurality of control models. For example, the plurality of control models may include at least one of a global model (first control model) learned based on a device control history of a user of the plurality of mobile terminals when the mobile terminal is manufactured and a personalization model (second control model) learned based on a device control history of a registered user of the mobile terminal.

Finally, the processor may control the control item for the control target device in a state where the mobile terminal and the external device are connected to each other by phone (S190).

A specific example will be described with reference to FIGS. 7 and 8 below.

FIG. 7 is a flowchart showing an intelligent device controlling method according to another embodiment of the present disclosure.

As shown in FIG. 7, first, the processor may receive a call (S701).

Subsequently, the processor may determine whether the mobile terminal is located inside the home (S702).

If the mobile terminal is not located inside the home, the processor stops the device control operation of the present disclosure until a next call is received.

If the mobile terminal is located inside the home, the processor may determine the location of the mobile terminal in the home, select (choices) a candidate of the control target device, and ascertain (determine) a current state of the control item of each control target device (S703).

Subsequently, the processor may determine whether or not the location of the mobile terminal is changed while the call is connected (S704).

If the location of the mobile terminal is changed while the call is connected, the processor again determines the location of the mobile terminal in the home, reselects the candidate of the control target device, and ascertains the current state of the control item (S703).

If the location of the mobile terminal is not changed while the call is connected, the processor may control the control item of the control target device based on the pre-learned control model (S705).

Thereafter, the processor may determine whether or not a readjustment input of the user for a control result is received (S706).

As a result of the determination, when the readjustment input of the user for the control result is not received, the processor may maintain the device control based on the pre-learned control model (S705).

As a result of the determination, when the readjustment input of the user for the control result is received, the processor may update the personalization model among the plurality of pre-learned control models based on the readjustment input (S707).

FIG. 8 shows a control model according to an embodiment of the present disclosure.

As shown in FIG. 8, a plurality of control models 800 according to an embodiment of the present disclosure may include a global model 801 and a personalization model 802.

The descriptions of the global model and the personalization model are the same as those described with reference to FIGS. 6 and 7.

The global model and personalization model may be stored in the memory of the mobile terminal, may be stored in the memory 25 of the AI device of FIG. 4, or may be stored in another external cloud server.

Hereinafter, an example of the intelligent device controlling method of the mobile terminal described with reference to FIGS. 1 to 8 will be described in detail.

As one example, in the device control step of FIGS. 6 and 7, the processor may select sound output sizes of a plurality of sound output devices that output sound among a plurality of external devices as a control item, and output the sound output sizes of the plurality of sound output devices. For example, the processor may turn off power of a cooking fan or lower a level of the cooking fan.

As another example, in the device control step, the processor may select a light output size of a plurality of light output devices which output light among the plurality of external devices as the control item, and control the light output size of the plurality of light output devices. For example, the processor may turn an illumination off or adjust the light output size of the illumination down.

As another example, in the device control step, the processor may identify a caller (for example, boss at work) who originates the call, input information related to the identified caller into the pre-learned personalization model, and select the control item as the output of the personalization model.

As another example, in selecting the control target device, in a situation where the processor selects a first device located within a preset distance at the time of start of the call as the control target device, if a distance from the first device is greater than the preset distance, the processor may stop the control of the first device.

As another example, when using the personalization model, the processor may select the control target device by reflecting a case where the control setting is in the phonebook stored in the memory.

As another example, when using the global model, in cases where there is no control setting associated with the phone book stored in the memory, there is a newly added external device even when there is the control setting associated with the phone book, and the call is a calling number restricted call, the processor may reflect the cases to select the control target device and control the control target device.

As another example, if the processor determines that the sound of external devices should be minimized at the time of the current call connection using the personalization model, the processor may lower a volume of the TV in the home, reduce a music output of a smart speaker, minimize a volume of public announcements in the home, and may display the content on the display by text at the time of the end of the call.

As another example, the processor may select a device generating a noise as the control target device and stop an operation which is a cause of the noise of the device generating the noise when the call is connected. For example, a robot cleaner that is cleaning a small room may change the priority of the next cleaning area from a living room where the mobile terminal is located to a large room. In addition, the processor may stop a cleaning operation of the robot cleaner cleaning a carpet of the living room in a turbo mode. In addition, the processor may lower a wing drive level of an air purifier which drives a wing at the highest level.

As another example, the processor may control the control target device based on a speech of a registered user while the call is connected. For example, when the registered user uses a phrase such as "Hi, Hello" while the call is connected and starts a conversation in a loud voice, a lighting level of a lighting device may be further increased. In addition, if the registered user detects a context requiring information confirmation such as "I need to check the schedule" while the call is connected, the processor may control the TV to display the corresponding search information on the current TV screen.

As another example, when the mobile terminal is located in the living room at the beginning of the call connection and then moved to a home room, the processor may select a device capable of outputting an audio as the control target device. For example, the processor may release controls of the devices which are controlled in the living room and reduce audio output of devices in the home room. In addition, a "home room cleaning progress rate" of the robot cleaner which cleans the home room is 90% or more, and thus, the robot cleaner does not move to another place and may move to a corner of the home room to stop the cleaning operation. In addition, the processor may stop controlling the air purifier located in the living room where the FAN drive level is lowered, and the air purifier may reset the fan level according to the current air quality conditions.

As another example, when the mobile terminal is moved to a location different from the initial location of the call connection, a control of the light controlled at the previous location may be stopped, and the light close to the location of the mobile terminal in the home room may be turned on.

As another example, when the call ends, the processor may store the control setting, the readjustment of the user, or the control item directly controlled by the user from the call connection to the end of the call in the memory, may also store the user information and locations of other users in the home, and may use these to update the global model and the personalization model.

When the call ends, the control of the control target device being controlled may be stopped.

Embodiment 1

An intelligent device controlling method of a mobile terminal, the method comprising: receiving a call for a call connection; selecting at least one control target device to control an operation while the call is connected, based on a location of the mobile terminal; selecting a control item of the at least one control target device using a plurality of pre-learned control models; and controlling the control item for the at least one control target device in a state where the call is connected.

Embodiment 2

In Embodiment 1, the plurality of control models includes a first control model which is learned based on a device control history for each user of a plurality of external mobile terminals, and a second control model which is learned based on a device control history of a registered user of the mobile terminal.

Embodiment 3

In Embodiment 2, the second control model is learned based on the device control history of the registered user and information related to a plurality of callers requesting the call connection to the mobile terminal, and the control item of the at least one control target device is acquired by inputting information related to the caller corresponding to the received call into the second control model.

Embodiment 4

In Embodiment 1, when the selected control target device is a sound output device capable of outputting a sound, the control item includes a sound output size of the sound output device.

Embodiment 5

In Embodiment 1, when the selected control target device is a light output device capable of outputting light, the control item includes a light output size of the light output device.

Embodiment 6

A mobile terminal comprising: a memory; a communication unit; and a processor, wherein the processor receives a call for a call connection through the communication unit, selects at least one control target device to control an operation while the call is connected, based on a location of the mobile terminal acquired through the communication unit, selects a control item of the at least one control target device using a plurality of pre-learned control models stored in the memory, and controls the control item for the at least one control target device in a state where the call is connected, through the communication unit.

Embodiment 7

In Embodiment 7, the plurality of control models include a first control model which is learned based on a device control history for each user of a plurality of external mobile terminals, and a second control model which is learned based on a device control history of a registered user of the mobile terminal.

Embodiment 8

In Embodiment 7, the second control model is learned based on the device control history of the registered user and information related to a plurality of callers requesting the call connection to the mobile terminal, and the control item of the at least one control target device is acquired by inputting information related to the caller corresponding to the received call into the second control model.

Embodiment 9

In Embodiment 6, when the selected control target device is a sound output device capable of outputting a sound, the control item includes a sound output size of the sound output device.

Embodiment 10 in Embodiment 6, when the selected control target device is a light output device capable of outputting light, the control item includes a light output size of the light output device.

Embodiment 11

A non-transitory computer-readable medium in which a computer-executable component configured to be executed in one or more processors of a computing device is stored, wherein the computer-executable component receives a call for a call connection, selects at least one control target device to control an operation while the call is connected, based on a location of the mobile terminal, selects a control item of the at least one control target device using a plurality of pre-learned control models, and controls the control item for the at least one control target device in a state where the call is connected.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

Effects of the intelligent device controlling method, the mobile terminal, and the intelligent computing device according to the present disclosure are as follows.

According to the present disclosure, it is possible to improve the call environment by controlling the operation of the device around the smart phone (mobile terminal) at the time of the call connection of the smart phone.

In addition, according to the present disclosure, it is possible to realize the call environment optimized for the call pattern the user.

Effects obtained in the present disclosure are not limited to the effects mentioned above, and other effects not mentioned can be clearly understood by a person skilled in the art from the above descriptions.

What is claimed is:

1. An intelligent device controlling method of a mobile terminal, the method comprising:
   receiving a call for a call connection;
   selecting at least one control target device to control an operation while the call is connected, based on a location of the mobile terminal;
   selecting a control item of the at least one control target device using a plurality of pre-learned control models; and
   controlling the control item for the at least one control target device in a state where the call is connected,
   wherein the plurality of pre-learned control models include a first control model which is learned based on a device control history for each user of a plurality of external mobile terminals, and a second control model which is learned based on a device control history of a registered user of the mobile terminal.

2. The method of claim 1, wherein the second control model is learned based on the device control history of the registered user and information related to a plurality of callers requesting the call connection to the mobile terminal, and the control item of the at least one control target device is acquired by inputting information related to the caller corresponding to the received call into the second control model.

3. The method of claim 1, wherein when the selected control target device is a sound output device capable of outputting a sound; the control item includes a sound output size of the sound output device.

4. The method of claim 1, wherein when the selected control target device is a light output device capable of outputting light, the control item includes a light output size of the light output device.

5. A mobile terminal comprising:
a memory;
a communication unit; and
a processor, wherein
the processor receives a call for a call connection through the communication unit,
selects at least one control target device to control an operation while the call is connected, based on a location of the mobile terminal acquired through the communication unit,
selects a control item of the at least one control target device using a plurality of pre-learned control models stored in the memory, and
controls the control item for the at least one control target device in a state where the call is connected, through the communication unit,
wherein the plurality of pre-learned control models include a first control model which is learned based on a device control history for each user of a plurality of external mobile terminals, and
a second control model which is learned based on a device control history of a registered user of the mobile terminal.

6. The mobile terminal of claim 5, wherein the second control model is learned based on the device control history of the registered user and information related to a plurality of callers requesting the call connection to the mobile terminal, and the control item of the at least one control target device is acquired by inputting information related to the caller corresponding to the received call into the second control model.

7. The mobile terminal of claim 5, wherein when the selected control target device is a sound output device capable of outputting a sound, the control item includes a sound output size of the sound output device.

8. The mobile terminal of claim 5, wherein when the selected control target device is a light output device capable of outputting light, the control item includes a light output size of the light output device.

9. A neon-transitory computer-readable medium in which a computer-executable component configured to be executed in one or more processors of a computing device is stored, wherein the computer-executable component receives a call for a call connection,
selects at least one control target device to control an operation while the call is connected, based on a location of the mobile terminal,
selects a control item of the at least one control target device using a plurality of pre-learned control models, and
controls the control item for the at least one control target device in a state where the call is connected,
wherein the plurality of pre-learned control models include a first control model which is learned based on a device control history for each user of a plurality of external mobile terminals, and
a second control model which is learned based on a device control history of a registered user of the mobile terminal.

\* \* \* \* \*